United States Patent [19]

Eguchi et al.

[11] Patent Number: 5,015,423

[45] Date of Patent: May 14, 1991

[54] METHOD OF MAKING UNIFORM POLYMER PARTICLES

[75] Inventors: Tamiyuki Eguchi; Michito Tsunomori, both of Kobe, Japan

[73] Assignee: Kanegafuchi Kagaku Kogyo Kabushiki Kaisha, Osaka, Japan

[21] Appl. No.: 430,923

[22] Filed: Nov. 1, 1989

Related U.S. Application Data

[62] Division of Ser. No. 112,990, Oct. 27, 1987, abandoned.

[30] Foreign Application Priority Data

| | | | |
|---|---|---|---|
| Oct. 29, 1986 | [JP] | Japan | 61-257627 |
| Oct. 31, 1986 | [JP] | Japan | 61-261517 |
| Oct. 31, 1986 | [JP] | Japan | 61-261518 |
| Nov. 12, 1986 | [JP] | Japan | 61-270595 |

[51] Int. Cl.$^5$ ............................................. B29B 9/10
[52] U.S. Cl. ............................................ 264/9; 264/5
[58] Field of Search ............................ 264/9, 10, 5, 4

[56] References Cited

U.S. PATENT DOCUMENTS

| | | | |
|---|---|---|---|
| 2,510,574 | 6/1950 | Greenhalgh | 264/9 |
| 3,313,608 | 4/1967 | Guyer et al. | 264/9 |
| 3,373,232 | 3/1968 | Wise et al. | 264/9 |
| 4,302,166 | 11/1981 | Fulwyler et al. | 425/6 |
| 4,599,294 | 7/1986 | Matsumoto et al. | 430/137 |
| 4,663,447 | 5/1987 | Yamazaki et al. | 428/402 |
| 4,686,269 | 8/1987 | Tokunaga et al. | 428/402 |
| 4,755,428 | 7/1988 | Noda et al. | 428/402 |
| 4,774,304 | 9/1988 | Kuhls et al. | 428/402 |

FOREIGN PATENT DOCUMENTS

| | | |
|---|---|---|
| 0167690 | 1/1986 | European Pat. Off. ........... 264/4 |
| 52-129686 | 10/1977 | Japan . |
| 52-129788 | 10/1977 | Japan . |
| 56-24430 | 3/1981 | Japan . |
| 56-33134 | 8/1981 | Japan . |
| 52-102905 | 6/1982 | Japan . |
| 57-159801 | 10/1982 | Japan . |
| 59-112833 | 6/1984 | Japan . |
| 61-83202 | 4/1986 | Japan . |
| 62-191033 | 8/1987 | Japan . |

OTHER PUBLICATIONS

*ICLAS*, "Monodisperse Atomization Systems for Pesticide Sprays", 181–185 and 459–460, 1978.
*ICLAS*, "Uniform Size Droplets by Longitudinal Vibration of Newtonian and Non-Newtonian Fluids", 37–47, 1982.
*Trans. Amer. Soc.*, "Clinical Evaluation of Chronic, Intermittent, and Short Term Hemoperfusions in Patients with Chronic Renal Failure Using Semipermeable Microcapsules (Artifical Cells) Formed from Membrane-Coated Activated Charcoal", 17, 246, 1971.
*Hemoperfusion*, "In Vitro Assessment of Charcoal and Resin Hemoadsorbents", 1981.
*Jinkozoki* 12(1), 116, 1983.
*The Review of Scientific Instruments*, "Source of Uniform-Sized Liquid Droplets", 35, 1349 (1964).

*Primary Examiner*—Mary Lynn Theisen
*Attorney, Agent, or Firm*—Armstrong, Nikaido, Marmelstein, Kubovcik & Murray

[57] ABSTRACT

Uniform polymer particles in a spherical form, having a three dimensional network structure, wherein not less than 80% by volume of the whole particles have a particle size within the range of ±20% of the volume average particle size of said uniform polymer particles, and said uniform polymer particles do not include particles having a particle size of not more than 5% of the volume average particle size, a process for preparing the uniform polymer particles, an apparatus suitable for use in the process, and a method of direct extracorporeal hemo-perfusion treatment using the uniform polymer particles. The uniform polymer particles of the present invention can be also used in various uses such as a parent material for an ion exchange resin, an adsorbent, and a packing material for a chromatography.

9 Claims, 2 Drawing Sheets

METHOD OF MAKING UNIFORM POLYMER PARTICLES

This application is a division of application Ser. No. 112,990 filed Oct. 27, 1987, now abandoned.

BACKGROUND OF THE INVENTION

The present invention relates to uniform polymer particles, a process for preparing the uniform polymer particles, an apparatus suitable for use in the process and a method of direct extracorporeal hemo-perfusion treatment using the uniform polymer particles. More particularly, the present invention relates to uniform polymer particles which can be widely used, for instance, as a parent material for an ion exchange resin, as a packing for a chromatograph, as a support onto which an enzyme is immobilized, as a support for an affinity chromatograph, as a material for a foamed article, and the like; to a process for preparing the uniform polymer particles; to an apparatus for forming uniform liquid droplets by jetting a liquid with a high viscosity, containing a natural high molecular substance or a synthetic high molecular substance, from an orifice at a constant flow rate while applying cyclic turbulences having a constant frequency thereto; and to a method of direct extracorporeal hemo-perfusion treatment using the uniform polymer particles.

As methods for preparing polymer particles in a spherical form, there have been hitherto known dispersion methods and spray methods.

According to a dispersion method, polymer particles are obtained by coagulating a dilute polymer solution containing a pore-forming agent being dispersed in the form of droplets in a dispersion medium containing a surface active agent, through volatilizing the solvent thereof [cf. Japanese Unexamined Patent Publication (Tokkyo Kokai) No. 24430/1981], or through gradually adding a coagulating agent for the droplets [cf. Japanese Unexamined Patent Publication (Tokkyo Kokai) No. 159801/1982]. However, in the dispersion method, no polymer particles other than polymer particles with a broad particle size distribution can be obtained. Also, in the dispersion method, in order to remove the solvent, the dispersion medium and the surface active agent from the coagulated particles, it is necessary to wash the coagulated particles not only with water but also with an organic solvent.

There is known another dispersion method in which polymer particles are obtained by polymerizing polymerizable monomers after dispersing the monomers in a dispersion medium, the polymer particles thereby obtained also have a broad particle size distribution. In observing the particles by an electron microscope, there can be found that minute spherical particles aggregate to form a particle. When a suspension of the above-obtained particles is stirred by a magnetic stirrer, minute polymer chips occur in a large amount, which is presumed to be due to the above-described structure of the particles. Further, the particles obtained by the above method have pores with a broad pore size distribution. Especially, on the particle surface, the particles have various size of openings.

According to a spray method, polymer particles is obtained by spraying a polymer solution into a coagulating liquid. Thus obtained polymer particles also have a broad particle size distribution and the particles have relatively large particle size [cf. Japanese Unexamined Patent Publication (Tokkyo Kokai) No. 129788/1977].

Polymer particles with a broad particle size distribution require a further process of classification. As generally known, by a classifying process, for instance, a sieving process, it is possible to make not less than 80% by volume of the whole particles have a particle size within the range of ±20% of the volume average particle size. In the sieving process, it is also possible to remove particles with a particle size of not less than the size of sieve opening by the sieve. However, in order to pass all of the particles with a particle size of less than the size of sieve opening, a long time sieving is necessary. Further, using the sieving process results in a very low yield. Therefore, it is not industrially practical to use such a process. Particularly, it is practically very difficult or virtually impossible to remove all of particles having a particle size of not more than 5% of the volume average particle size.

When very small particles or very large particles are included in the polymer particles, various problems arise in uses of the particles. For instance, when the particles are used as a packing for chromatography or an adsorbent, the very small particles are mixed in the liquid to be treated, or cause a large pressure drop, and the very large particles cause a lowering of the separation efficiency or the adsorption rate.

When particles having pores with a broad pore size distribution, particularly openings on the particle surface with a broad opening size distribution, are used as an adsorbent, such particles cause an inferior physical selectivity.

Recently, there has been found a technique for forming uniform liquid droplets, in which cyclic turbulences are applied to a liquid jetted at a constant flow rate (hereinafter such technique referred to as "vibration method").

There has been already reported that uniform particles are obtained by applying the above technique to the dispersion method using polymerizable monomers [cf. Japanese Unexamined Patent Publication (Tokkyo Kokai) 102905/1982]. However, the particles thus obtained have the above-stated structure, i.e. minute particles coagulate to form a particle, and therefore the particles have defects in that polymer chips easily occur and that the particles have pores with a broad pore size distribution.

There are reported some examples of polymer particles or capsules that are prepared by applying the vibration method [cf. Japanese Unexamined Patent Publication (Tokkyo Kokai) No. 129686/1977 and Japanese Unexamined Patent Publication (Tokkyo Kokai) No. 112833/1984]. However, in an example disclosed in Japanese Unexamined Patent Publication No. 129686/1977, a very dilute polymer solution, i.e. a solution with a very low viscosity is employed and microcapsules are prepared in another example disclosed in Japanese Unexamined Patent Publication No. 112833/1984, and particles with a large particle size are prepared since nozzles themselves are directly vibrated and therefore the vibration frequency is restricted to a low frequency. In both examples, it is necessary that a multiple tubular nozzle is employed and more than one kinds of solutions are simultaneously jetted with keeping a delicate balance.

Also, in Japanese Examined Patent Publication (Tokkyo Kokoku) No. 33134/1981, there is disclosed that the vibration method is applied to a process for preparing uniform particles of an inorganic compound. In this or other publications, cyclic turbulences of flow rate of the liquid jetted from an orifice of a nozzle are applied by applying vibrational energy to the whole nozzle part.

Generally, the force F (dyn) required to vibrate an object with a mass M (g) at a frequency f (Hz) with an amplitude 2D (cm) is calculated by the following equation:

$$F = M \cdot (2\pi f)^2 \cdot D$$

For instance, when the total vibrating mass of nozzle and vibration transmission part is 1,000 g, the frequency is 10,000 Hz and the amplitude is 10 μm, F is about $2 \times 10^9$ dyn. In order to stably generate the above vibration by an electromagnetic coil vibrator, there is required an electric power as enormous as several tens of KVA. Therefore, it is not economical to directly vibrate the nozzles, particularly when a high frequency of vibration is required.

In Japanese Unexamined Patent Publication (Tokkyo Kokai) No. 83202/1986, it is disclosed that the vibration method is applied to form uniform liquid droplets of polymerizable monomers. In this case, such enormous energy as in the previous case is not required since the vibration is directly transmitted to the polymerizable monomers by a piezoelectric vibrator which itself constitutes a part of the vessel containing the monomers which are jetted through the orifices. However, when employing a high viscosity liquid such as a polymer solution, not a low viscosity liquid such as a polymerizable monomer, it is supposed that a high pressure is imposed on the piezoelectric vibrator and therefore the vibrator is destroyed or the vibrator does not generated a stable vibration. Also, there is the possibility that the vibrator does not vibrate a stable vibration when the liquid is heated in order to reduce the viscosity.

W. E. Yates and his co-worker developed an apparatus for preparing uniform liquid droplets using a magnetostrictive vibrator as a vibration generator. [cf. W. E. Yates and N. B. Akesson, Proceedings of the 1st International Conference on Liquid Atomization and Spary Systems (Proc. ICLASS), 181-185 and 459 to 460 (1978)]. In the above apparatus, the vibration transmission part is embedded in a fixing cylinder with a potting agent, and at the end thereof is fixed to a vibrating rod. As well known by a person skilled in the art, the vibration transmission part is precisely designed so as to resonate with the vibration generated by the magnetostrictive vibrator and so as to have a function of amplifying its small amplitude of vibration. The vibrating rod is also precisely designed so that the amplitude reaches its maximum at the end of the rod by resonating with the vibration generated by the magnetostrictive vibrator. Therefore, when the vibration-transmission part is heated or subjected to an external force, a constant vibration can not be obtained, since the vibration transmission part or the vibrating rod does not resonate with the magnetostrictive vibrator. In the apparatus of W. E. Yates et al., it is not possible to keep the temperature of the vibration transmission part constant and to restrict external force being applied only to the end of vibrating rod. Therefore, it is presumed that it is not possible to form uniform liquid droplets from a high temperature liquid or a high pressure liquid by the apparatus of W. E. Yates et al.

Various conditions for preparing uniform liquid droplets by the vibration method have been studied in detail as disclosed by T. Sakai [cf. T. Sakai, Proc. ICLASS-'82, 37 to 45 (1982)]. It has been found that when uniform liquid droplets are stably formed, parameters including a viscosity and a surface tension of the liquid, a flow rate of liquid jetted from the orifice, a size of the orifice, and a frequency and a displacement of cyclic turbulences are within a specific range is (hereinafter, such specific range is referred to as "synchronized condition"). As a general tendency, the higher the liquid viscosity becomes and the smaller the size of the orifice becomes, the higher flow rate and frequency of jetted liquid are required to be synchronized. That is, in order to form liquid droplets with a small diameter from a liquid containing high molecular substances, the aperture diameter of the orifice must be small, and the flow rate and frequency of jetted liquid must be high. In addition, in many cases, such liquid has a high temperature and a high pressure. Consequently, it is difficult to form uniform liquid droplets with a small particle size from such liquid by applying the conventional methods.

In recent years, there has been tried an extracorporeal hemo-perfusion treatment using an adsorbent, for various obstinate diseases and its effect has been confirmed. As generally known, blood cells are physiologically quite unstable outside of the body, and therefore easily injured. For instance, there occurs a decrease in their number because of their adhesion to the matters with which blood cells contact, e.g. by hemolysis or coagulation. Therefore, in an extracorporeal hemo-perfusion treatment, blood is separated into unstable blood cells and relatively stable blood plasma by a centrifugal separator or by a membrane for the separation of blood plasma, and then the blood plasma containing pathogenic substances is treated by an adsorbent. However, it is known as a matter of course that if blood can be treated directly by an adsorbent, not only the extracorporeal hemo-perfusion treatment system can be remarkably simplified but also physiological burden to the patient can be alleviated.

As for the relationship between blood compatibility and adsorbent characteristics, in other words, whether an adsorbent injures blood or not, though there are many points not explicated chemically, there has been physically explicated a point that in order not to injure blood, an adsorbent should be smooth on its surface and the pressure drop occured in using it should be small.

A granular activated charcoal adsorbent has been employed in a direct extracorporeal hemo-perfusion system since decades ago [cf. T. M. S. Chang et al, Trans Amer. Soc. Artif. Int. Organs 17, 246 (1971)]. At the beginning, an adsorbent covered with a hydrophilic polymer was employed for the purpose of avoiding the effluence of activated charcoal and improving the chemical blood compatibility. Recently, uncovered activated charcoal with smooth surface has been employed [cf. V. Bonomini and T. M. S. Chang, "Hemoperfusion" (1981), ISBN 3-8055-3421-3]. This fact shows that the relationship between blood compatibility and chemical characteristics of adsorbent is hard to estimate since the chemical properties of the surface of the above two adsorbents are quite different. The granular activated charcoal has a relatively large average particle size of 0.5 to 3 mm. The granular activated charcoal adsorbent is employed with the object of adsorbing blood plasma components having a relatively low molecular weight. Such components can be rapidly adsorbed even if the granular activated charcoal has a large particle size. However, pathogenic substances causing obstinate diseases are, in many cases, substances having a high molecular weight of several hundreds of thousand to several millions daltons. Since such substances having a high molecular weight diffuse at a low rate, it is required that particles for an adsorbent for such substances have a particle size of not more than about 400 μm, preferably not more than 300 μm so as to attain a practical adsorption rate. However, there has not been hitherto well known an example of carring out a direct extracorporeal hemo-perfusion treatment using granular activated charcoal adsorbent having such a small particle size. Though there is a report in which a direct extracorporeal hemo-perfusion treatment is carried out using a modified polyvinyl alcohol gel having particle sizes of 74 to 210 μm [cf. Ichikawa et al, Jinkozoki 12 (1), 116 (1983)], there are not reported data showing whether a hemolysis occurs or not and data of pressure drop, these data being basic data relating to blood compatibility.

As described above, in prior arts, there are defects that the polymer particles have a broad particle size distribution or that minute polymer chips occur due to the particle structure, and further that in preparing such polymer particles, such a complicated apparatus as a multiple tubular nozzle is necessary and a delicate operation is required.

In a conventional apparatus for forming liquid droplets, it is difficult to form uniform liquid droplets having a small particle size from a high viscosity liquid. Further, when the liquid has a high temperature and a high pressure, it is still more difficult to form uniform liquid droplets with a conventional apparatus.

An object of the present invention is to provide uniform particles having a structure which does not cause an occurence of minute polymer chips and a process for preparing such particles.

A further object of the present invention is to provide an apparatus suitable for use in the above process, which can form uniform liquid droplets from a liquid even if the liquid has not only a high viscosity but also a high temperature and a high pressure.

As described above, through there has not been explicated what chemical properties an adsorbent should have so that a direct extracorporeal hemo-perfusion treatment can be carried out employing the adsorbent, at least, the pressure drop occured in using it should be small, and the surface of the adsorbent should be smooth. Further, it has not been clear what properties of the adsorbent are suitable for evaluating blood compatibility therewith since conventional adsorbents have a broad particle size distribution. As described above, there are many points not explicated chemically as to the relationship between blood compatibility and the properties of the adsorbent.

A still further object of the present invention is to provide a method of direct extracorporeal hemo-perfusion treatment using uniform polymer particles with a practical flow rate of blood to be treated without causing problems such as hemolysis and increase in pressure drop.

SUMMARY OF THE INVENTION

The present inventors have found that uniform polymer particles in a spherical form, having a three dimensional network structure and having a structure which does not cause an occurrence of polymer chips can be prepared without using a complicated apparatus, such as a multiple tubular nozzle, when a polymer solution is jetted from an orifice into a gas atmosphere in the form of uniform liquid droplets with electric charges of the same sign at a constant flow rate while applying cyclic turbulences having a constant frequency to the solution, the droplets are let fly through the gas atmosphere, and then the droplets are let into a coagulating liquid which is a non-solvent for the polymer of the polymer solution, is miscible with the solvent of the polymer solution, and has a surface tension sufficient to spontaneously wet the liquid droplets, the distance of the gas atmosphere between the orifice and the surface of the coagulating liquid being such that the droplets are not greatly deformed by the collision with the coagulating liquid.

The present inventors eagerly studied in order to provide uniform polymer particles suitable for use in direct extracorporeal hemo-perfusion treatment which do not cause problems such as hemolysis and increase in pressure drop even if their particle size is not more than 400 μm, and investigated particle properties required for direct extracorporeal hemo-perfusion treatment, paying attention only to physical properties. As a result, the present inventors have found that a direct extracorporeal hemo-perfusion treatment can be carried out at a practical flow rate of blood to be treated, without problems such as hemolysis and increase in pressure drop, by using uniform polymer particles having a volume average particle size of 80 to 400 μm, wherein not less than 80% by volume of the whole particles have a particle size within the range of ±20% of the volume average particle size, the content of particles having a particle size of less than 74 μm is not more than 5% by volume, the content of particles having a particle size of less than 25 μm is not more than 0.1% by volume, and said uniform polymer particles do not include particles having a particle size of not more than 5% of the volume average size. It has also been found that such particles, with a narrow particle size distribution, are prepared by a process hitherto unknown.

According to the present invention, there is provided uniform polymer particles in a spherical form, having a three dimensional network structure, wherein not less than 80% by volume, preferably 90% by volume of the whole particles have a particle size within the range of ±20% of the volume average particle size, more preferably within the range of ±10% of the volume average particle size, and the polymer particles do not include particles having a particle size of not more than 5% of the volume average particle size.

Secondly, there is provided a process for preparing uniform polymer particles in a spherical form which comprises jetting a polymer solution, in the form of uniform liquid droplets with electric charges with a same sign, from an orifice into a gas atmosphere at a constant flow rate while applying cyclic turbulences having a constant frequency to the solution, letting the droplets fly through the gas atmosphere and then letting the droplets into a coagulating liquid which is a non-solvent for the polymer of the polymer solution, is miscible with the solvent of the polymer solution, and has a surface tension sufficient to spontaneously wet the liquid droplets, the distance of the gas atmosphere between the orifice and the surface of the coagulating liquid being such that the droplets are not greatly deformed by the collision with the coagulating liquid.

Thirdly, there is provided an apparatus for forming uniform liquid droplets, which comprises a cylinder having an inlet for a liquid and at least one orifice through which the liquid is sent out, a vibrating rod inserted in the cylinder, a vibration generator connected with the vibrating rod, and an O-ring for sealing the clearance between the cylinder and the vibrating rod.

Fourthly, there are provided a method of direct extracorporeal hemo-perfusion treatment comprising:

(1) taking out blood from a body;

(2) letting the blood pass through a container packed with uniform polymer particles in a spherical form, having a volume average particle size of 80 to 400 μm, wherein not less than 80% by volume of the whole particles have a particle size within the range of ±20% of the volume average particle size, the content of particles having a particle size of less than 74 μm is not more than 5% by volume, the content of particles having a particle size of less than 25 μm is not more than 0.1% by volume, and said uniform polymer particles do not include particles having a particle size of not more than 5% of the volume average particle size; and (3) returning the blood to the body.

DETAILED DESCRIPTION

The meanings of some specific terms or measuring process used in the present specification are explained below.

The term "polymer particles in a spherical form" means polymer particles in the form of a spheroid, smooth on the surface, which are applicable to various uses.

The term "uniform particles" means particles wherein not less than 80% by volume of all of the particles have a particle size within the range of ±20% of, preferably within the range of ±10%, of the volume average particle size.

The term "volume average particle size" is the value obtained by classifying particles by means of wet sieve classification, in which water, an alcohol or the like is employed as a dispersion medium, using standard sieves under Japanese Industrial Standards, collecting particles captured in each sieve, measuring each total volume of particles sedimented after allowing them to stand for one day, and calculating according to the following equation:

$$\text{volume average particle size} = \frac{\Sigma DiVi}{\Sigma Vi}$$

wherein Di is the size of sieve opening, and Vi is each total volume of sedimented particles in particles captured in each sieve having the size of sieve opening of Di.

The term "particles with particle size of less than D μm" means particles which pass through a sieve with the size of sieve opening of D μm. The term "particles with a particle size of not less than D μm" means particles do not pass through a sieve with the size of sieve opening of D μm.

When not less than 80% by volume of all of the particles have a particle size within the range of ±20% of the volume average particle size, such polymer particles can be employed in various uses as they are without a classification process. Further, when not less than 90% by volume of all of the particles have a particle size within the range of ±20% of the volume average particle size, such polymer particles have advantages in that not only is a classification process not needed, but also, in using it as parent material for an ion exchange resin or as a packing for a chromatograph, they can be uniformly packed and the pressure drop is small.

When uniform polymer particles have a volume average particle size of 10 to 1,000 μm, such uniform polymer particles can be generally used in the above-stated uses. When a uniform polymer particles have a volume average particle size of 10 to 500 μm, such uniform polymer particles can be used as parent material for an ion exchange resin with a high ion exchange rate, as an adsorbent with a high adsorption rate and high selectivity, or as a packing for a chromatograph for an industrial use. When uniform polymer particles have a volume average particle size of 20 to 250 μm, such uniform polymer particles can be used as ana adsorbent or a packing for a chromatograph for substances with a high molecular weight with sharp fractions in addition to the uses described above.

However, uniform polymer particles having a volume average particle size of less than 10 μm are hard to produce.

The presence of very small particles with a particle size of less than 5 μm, which contaminate a treating liquid or cause an increase in pressure drop, was determined by a microscope or a Coulter Counter (commercially available under the trade name "Coulter Counter" made by Coulter Electronics Inc.)

The term "three dimensional network structure" literally means a structure in which the fiber or porous sheet is three dimensionally connected with each other, in contrast to particles made by polymerizing polymerizable monomers having a structure such that minute particles aggregate.

The term "direct extracorporeal hemo-perfusion treatment" means that in an extracorporeal hemo-perfusion treatment, blood is treated by an adsorbent directly without separating the blood into blood cell and blood without separating the blood into blood cell and blood plasma.

In order to obtain firm polymer particles which do not cause an occurrence of minute polymer chips, the polymer concentration of the polymer solution, though it is determined depending on the molecular weight of the polymer, should be not more than 5% by weight. Such polymer solution is a solution of polymer with a relatively high degree of polymerization, having a viscosity, though its viscosity depends on the temperature at which the measurement of viscosity is carried out, of not less than about 10 cP, preferably not less than about 50 cP. When the solution has a viscosity of more than 2,000 cP, it is hard to form liquid droplets having a particle size of nor more than 1,000 μm by a vibration method. Therefore, the viscosity of solution is preferably nor more than 2,000 cP.

As previously mentioned, in order to form uniform liquid droplets, the viscosity and surface tension of polymer solution, the flow rate of liquid, the size of orifice, and the frequency and displacement of cyclic turbulences, these parameters being mutually related, should be adjusted in a specific range (synchronized condition).

When the diameter of liquid droplets to be formed is more than 1,000 μm, the synchronized condition can be also attained by directly vibrating the nozzle [cf. T. Sakai, Proc. ICLASS-1982, 37 (1982)]. However, when the particle size of liquid droplets to be formed is small, the frequency to be synchronized is so high that an enormous amount of energy is required to directly vibrate the nozzle. Therefore, in this case it is preferably to apply cyclic turbulences directly to the solution. Especially, when the diameter of liquid droplets to be formed is not more than 250 μm, the frequency to be synchronized reaches 3,000 to 40,000 Hz.

Figure 1:
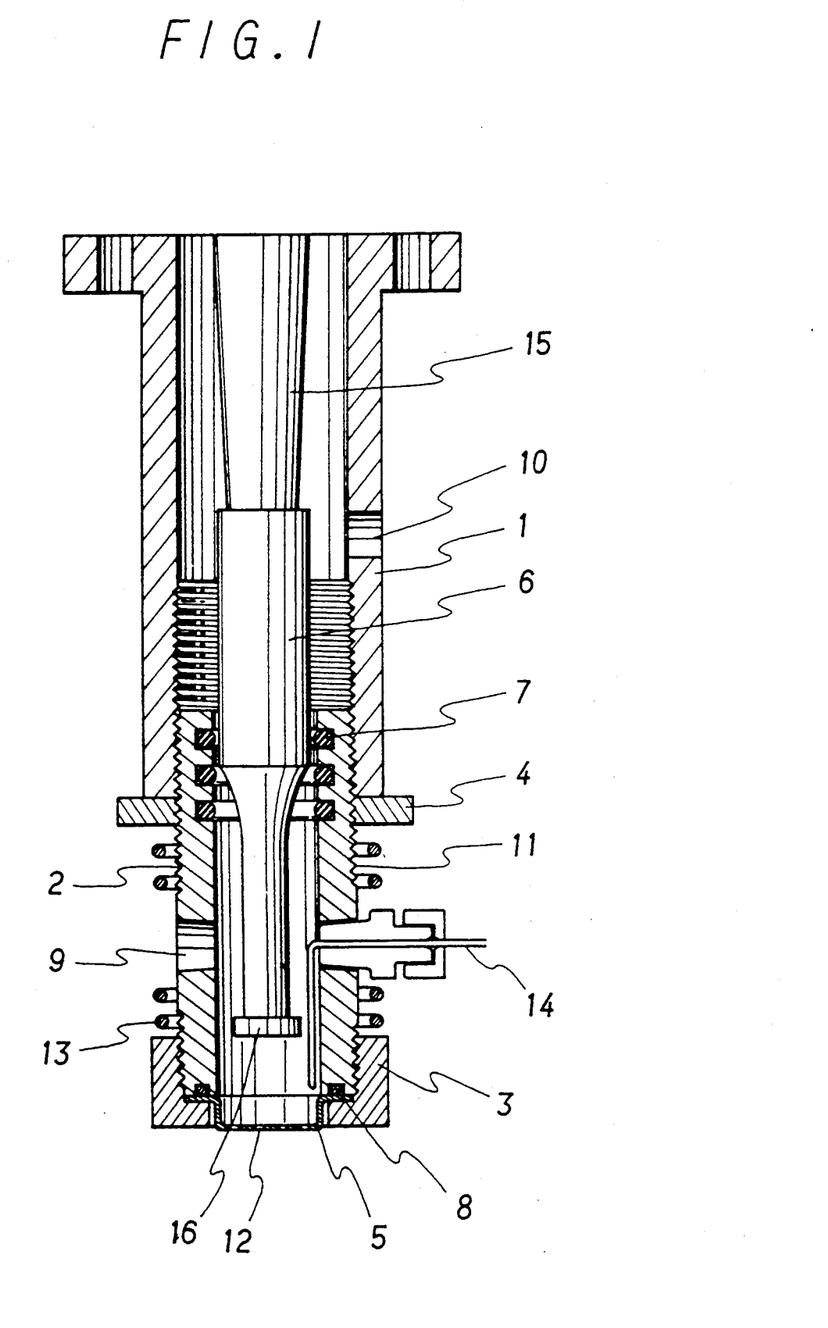
FIG. 1 is a schematic sectional view showing an apparatus for forming uniform liquid droplets of the present invention.

In FIG. 1, the cylinder (2) is fixed on the fixing cylinder (1). The nut (4) is tightened up to ensure the fixation between the cylinder (2) and the fixing cylinder (1). The cylinder (2) has an inlet for a liquid and orifices (12). The cylinder (2) is further equipped with an O-ring (7) in the position where the vibrating rod (6) slides, for sealing the clearance between the cylinder (2) and the vibrating rod (6).

The vibrating rod (6) was connected to a vibration transmission part (15) in order to transmit vibration generated by a vibration generator (not shown in FIG. 1), for instance, a magnetostrictive vibrator, an electrostrictive vibrator or a electromagnetic coil vibrator, to the vibrating rod (6).

When a magnetostrictive vibrator or an electrostrictive vibrator is employed as a vibration generator, the vibrator, the vibration transmission part (15) and the vibrating rod (6) are organized so as to form a resonator. When an electromagnetic coil vibrator is employed as a vibration generator, the vibrating rod (6) is directly connected with the vibrator of the vibration generator. In the latter case in order to reduce the weight of the vibrating rod (6), it is preferred that the vibrating rod (6) is thin except for the end (16) of vibrating rod (6) which is thick as shown in FIG. 1.

In order to efficiently transmit the vibrational energy to the vibrating rod (6), it is preferable to employ an O-ring (7) having a small contact resistance for sealing the clearance between the cylinder (2) and the vibrating rod (6).

The distance between the nozzle (5) having orifices (12 and the end (16) of vibrating rod (6) can be suitably controlled by a screw (11) on the cylinder (2) and a nut (4) for fixing the cylinder.

The nozzle (5) is fixed to an end of the cylinder (2) by a nut (3) for fixing the nozzle (5). The clearance between the nozzle (5) and the cylinder (2) is sealed by an O-ring (8).

The liquid solution is introduced by a gear pump into the cylinder (2) through an inlet for the liquid (9) and is jetted from the orifices (12) while applying a cyclic pressure change to the liquid by a reciprocating motion of the vibrating rod (6) over the nozzle (5). If necessary, a polymer solution in the cylinder (2) can be heated by a heater (13). A temperature sensor (14) is therefore also used for managing the temperature.

FIG. 1 shows an apparatus with a magnetostrictive vibrator as a vibrating generator. The magnetostrictive vibrator is used for the purpose of generating vibration with a particularly high frequency, for instance, supersonic vibration with a frequency of about 20,000 to 40,000 Hz. When the apparatus for forming liquid droplets of the present invention is used and the above-mentioned vibration with a high frequency is applied, uniform liquid droplets with a small particle size are obtained. Herein, the term "uniform liquid droplets" means that the droplets are produced under a synchronized condition, in other words, the droplets are produced periodically with the same frequency as the vibrating rod (6).

The frequency of vibration is preferably 1,000 to 40,000 Hz, more preferably 3,000 to 40,000 Hz. When the frequency is less than 1,000 Hz, it is difficult to form uniform liquid droplets. When the frequency is more than 40,000 Hz, the distance between the formed liquid droplets becomes too small and the reconnection frequency of liquid droplets becomes high, and consequently it becomes hard to form uniform liquid droplets.

The clearance between the vibrating rod (6) and the cylinder (2) is sealed by the O-ring (7) on a site so-called node, which is well known by a person skilled in the art, where the displacement is zero, and the friction caused by a slide of the vibrating rod (6) on the O-ring (7) can be almost neglected.

The distance between the end (16) of the vibrating rod (6) and the nozzle (5) is preferably 2 to 20 mm, more preferably 5 to 15 mm. In case such distance is less than 2 mm, when the frequency is as high as that of supersonic waves, a cavitation occurs and there arises a possibility of an erosion of the end (16) of vibrating rod (6) or the inside of the nozzle (5). In case such distance is more than 20 mm, the turbulences given by the vibrating rod (16) are attenuated before the turbulences reach the inside of nozzle (5), the turbulences are not transmitted to the liquid jetted from the orifice (12), and it becomes difficult to form uniform liquid droplets.

The nozzle (5) preferably has one or more than one orifices, and each orifice is preferably a round shape orifice having an aperture of not more than 500μm, more preferably 10 to 250 μm, still more preferably 20 to 100 μm.

When the orifice (12) has an aperture diameter of more than 500 μm, uniform liquid droplets having a diameter of not more than 1,000 μm, cannot be always obtained. As the shape of the orifice (12), there can be exemplified round shape, slit shape, rectangle, multiple tubular shape, and the like. Among them, round shape is preferable since spherical liquid droplets usable in many uses can be obtained.

If necessary, the apparatus may be equipped with a heater (13) so that a liquid in the cylinder (2) can be heated. The temperature sensor (14) may be used for managing the temperature of heated liquid. Particularly, when it is necessary to keep the liquid at a high temperature, the vibration transmission part (15) should be cooled so that the synchronized condition is maintained. The inlet/outlet of cool water (10) is used for that purpose.

When the liquid in the cylinder (2) is heated by the heater (13) in the present invention, it is preferable to cool the vibration transmission part (15) and a part of the vibrating rod (16) from the joint with the vibration transmission part (15) to the position contacting the O-ring (7) by, for instance, letting cool water flow there.

The process of forming very small liquid droplets from a high temperature, high pressure, and high viscosity liquid by the apparatus of the present invention is explained below.

A liquid sent from a gear pump at a constant flow rate is put into the cylinder (2) from the inlet of the liquid (9) and jetted from orifices (12) while applying a cyclic pressure change to the liquid by the vibrating rod (6).

As described above, as the size of orifice (12) becomes small, the synchronized flow rate of the liquid and frequency of the vibration become high and consequently the pressure applied to the liquid becomes high. The apparatus of the present invention has a pressure resistance of not less than several tens atm as is presumed from the structure thereof. As the viscosity of the liquid becomes high, the turbulences, i.e. The pressure change applied to the liquid at the orifice (12) by the vibrating rod (6), becomes large. The turbulences and the pressure change can be controlled by adjusting the distance between the nozzle (5) and the end (16) of the vibrating rod (6). However, when the viscosity is more than about 2,000 cP, in the case of using an orifice having an aperture diameter of not more than 100 μm, uniform liquid droplets cannot be formed even if a large pressure change is applied.

In order that the particles, which are obtained by forming uniform liquid droplets, and coagulating the droplets by contacting them with a coagulating liquid, have a mechanical strength which is high enough for using them in the above-stated uses, the concentration of polymer in the polymer solution should be at least about 5% by weight. Such solution has a viscosity at least about 10 cP, though the viscosity depends on the temperature. Therefore, in using the apparatus of the present invention, a liquid with a viscosity of 10 to 2,000 cP, preferably 50 to 2,000 cP is mainly employed.

Even if the liquid has such high viscosity, uniform liquid droplets can be formed, when the diameter of liquid droplets is more than about 1,000 μm, by a conventional apparatus in which the orifice is directly vibrated. However, when the diameter of liquid droplets is not more than 250 μm, the frequency of turbulences to be synchronized is not less than about 3,000 Hz. And since, as described above, an enormous amount of energy is required in order to directly vibrate the orifice, it is economical to apply the turbulences to the liquid directly as in the apparatus of the present invention.

It is possible to confirm whether the diameter of the liquid droplets is uniform or not in any usual manner. That is to say, in case uniform liquid droplets are formed, liquid droplets ranging at regular intervals can be seen by observing the droplets with a magnifying glass or taking a photograph of the droplets while the flashing cycle of the stroboscope is synchronized with the liquid droplets generation cycle.

The uniform liquid droplets formed move at random by air resistance with going away from the nozzle (5), and many liquid droplets collide and reconnect each other. As reported by J. M. Schneider et al, the reconnection of the liquid droplets can be prevented for a relatively long time by electrifying each of the liquid droplets with electric charges with a same sign [cf. Rev. Sci, Instr. 35, 1349 (1964)].

In the process of the present invention, the liquid droplets thus jetted into a gas atmosphere at a constant flow rate are let into a coagulating liquid which is a non-solvent for the polymer of the polymer solution, is miscible with the solvent of the polymer solution, and has a surface tension sufficient to spontaneously wet the liquid droplets, after the droplets are allowed to fly such a distance that the flying rate of droplets is lowered so low that the droplets are not greatly deformed by the collision with the coagulating liquid.

When the surface tension of coagulating liquid is more than that of the solvent of polymer solution and therefore the liquid droplets are not spontaneously wetted, the droplets float on the surface of the coagulating liquid for a long time even if the specific gravity of the liquid droplets is more than that the coagulating liquid, and droplets which reach the surface later collide with the floating droplets to form large reconnected droplets. On the other hand, when the droplets which reach the surface of coagulating liquid are wetted with the coagulating liquid, since the reconnection of droplets does not occur even if the droplets collide with the droplets which later reach the surface, and the droplets which later reach the surface are also wetted with the coagulating liquid, each droplet becomes a separate polymer particle. The coagulating liquid is selected from ones having a surface tension approximate to that of the solvent of the polymer solution or preferably ones having a surface tension of less than that of the solvent of the polymer solution.

As disclosed in a preceding patent application by the present inventors [Japanese Unexamined Patent Publication (Tokkyo Kokai) No. 191033/1987], when the viscosity of the polymer solution is high and the diameter of the liquid droplets is small, since the jetting rate of the polymer solution jetted from the orifice, i.e. The initial flying rate of the liquid droplets, reaches several m/sec to tens of m/sec, if these droplets are immediately let into the coagulating liquid, the droplets are broken or deformed to be a flat shape by the impact of the collision. In order to avoid such break or deformation, the jetted droplets should be let into the coagulating liquid after reducing flying rate of the droplets.

As described above, the reconnection of the liquid droplets can be prevented for a relatively long time by electrifying each of the liquid droplets with a single sign. In addition, the present inventors have found that the flying rate of the jetted liquid droplets is rapidly decreased by electrifying each of the liquid droplets with a single sign. Particularly, when the diameter of the liquid droplets is small, the synchronized initial flying rate is high, and therefore the liquid droplets without electric charges are sometimes deformed to be a flat shape even if letting the droplets fly a distance of 2 m. However, in case such liquid droplets have electric charges with a same sign, they enter the coagulating liquid without deformation even if letting the droplets fly a distance of 30 cm.

It is important to minimize the distance between the orifice and the surface of the coagulating liquid in preventing the reconnection of the liquid droplets. Therefore, the distance between the orifice and the surface of the coagulating liquid should be minimized as far as the droplets are not deformed in such extent that the droplets become not spheroidal.

When the liquid droplets have electric charges with a same sign, liquid droplets are scattered from each other because of their mutual repulsion. These droplets are attracted to a matter having the opposite electric charge or a grounded conductor. That is to say, the droplets flown off tend to be attracted to the wall of container for the coagulating liquid or the electrodes for providing electric charges. The droplets attracted to such matters cause some obstruction, for instance, ununiform particles are formed, the electric field strength is reduced, or the like. However, the whole of the liquid droplets can be attracted into the coagulating liquid by using an electric conductive coagulating liquid in a metallic container, and grounding the metallic container.

The porosity of the particles is controlled by various methods usually employed in dry-wet spinning processes.

It is known that the pore size of pores on the surface of particles prepared by the dry-wet spinning process have a high uniformity whether they have a skin layer or not.

Generally, when liquid droplets are coagulated by a coagulating liquid with a high coagulating activity, porous particles with a thin fine surface layer, so-called non-porous skin layer, are obtained. On the contrary, when a coagulating liquid having a low coagulating activity is employed, the particles have a skin layer with a porous structure. When a coagulating agent having a still lower activity is employed, the particles do not have a skin layer and the surface of particles also have a network structure.

Through a skin layer, substances having a size of not more than a certain size pass, but substances having a size of more than the certain size do not pass. By controlling the pore size of the skin layer, the molecular weight of the substance which pass through, which corresponds to the above-stated certain size, can be varied from decades to hundreds of thousand. Therefore, an adsorbent showing an excellent selectivity to a substance having such molecular weight can be obtained by employing particles with a skin layer. Conventional polymer particles prepared by polymerizing liquid droplets of polymerizable monomers do not have such advantage.

Particles which do not have a skin layer and have a network structure over the particle have an excellent selectivity to a substance having a molecular weight of more than the aforementioned, for instance, to a substance having a molecular weight of several millions. Also, even if the particles have such porous structure, minute polymer chips do not occur since the polymer in the particle have a three dimensional network structure formed by fiber or porous sheet.

Generally, the size of mesh of the three dimensional network structure decreases as the concentration of a polymer in the polymer solution increases.

The porosity of the particles can be also controlled by adding a poor solvent for the polymer to the polymer solution or by adding additives which can be easily removed by extraction, for instance, a water-soluble polymer such as polyethylene glycol, polyvinyl pyrrolidone or dextran to the polymer solution in an amount such that the viscosity of the polymer solution is a viscosity in the range of constituting a synchronized condition, that is, according to the experience of the present inventors, the range of not more than 2,000 cP.

A porous particulate polymer in a spherical form of the present invention, is thus obtained. In order to improve the characteristics of the polymers according to their uses, various post-treatment may be conducted. Particularly, heat-treatment in a non-solvent is effective to stabilize the particle structure.

In the process of present invention, any polymers being dissoluble in the solvent can be used. Examples of the polymers which are especially useful in the invention are mentioned below.

A polystyrene is useful as a packing material used for chromatography, which does not have defects such that when using, a large pressure drop is caused or minute particles contaminate the liquid to be treated, and as an adsorbent causing only a small pressure drop and no occurrance of minute polymer chips, and having excellent selectivety.

A polymer which is available for crosslinking and introduction of an ion exchange group, such as a styrene-butadiene copolymer or a styrene-chloromethylated styrene copolymer, is suitably used as a parent material for an ion exchange resin which causes only a small pressure drop, high ion exchange rate and no generation of minute polymer chips.

A polyvinyl alcohol or ethylene-vinyl alcohol copolymer is useful in affinity chromatography as a carrier having an active hydroxyl group, having excellent selectivety, and causing only a small pressure drop.

Also, various kinds of natural high molecular substances such as cellulose, silk, collagen, and their derivatives are useful as a carrier for chromatography as they are, or as a carrier for affinity chromatography.

Further, many other vinyl polymers and condensation polymers can be used for the above-mentioned uses.

The solvents of these polymer solutions are found in manuals, e.g. J. Brandrup, "Polymer Handbook 2nd edition", John Wiley and Sons, Inc. (1975), and the like. However, as mentioned later, the preferable coagulating liquid in the invention is an aqueous solution, therefore, a water-miscible solvent is desirable in order that it is miscible with the coagulating liquid. Examples of the solvent which is used in a number of polymer solutions are, for instance, N-methyl-2-pyrrolidone, dimethylformamide, dimethylacetoamide, dimethyl sulfoxide, diacetone alcohol, acetone, tetrahydrofuran, dioxane, and the like. Also, it is possible to use these solvents as an admixture, or mixed solvents of the above solvents with other solvents such as ethanol, methanol, ethylene glycol, propylene glycol and glycerol. Further, there can be added a water soluble polymer such as polyethylene glycol or polyvinyl pyrrolidone as an additive for the purpose of controlling the porosity of the particles, which can be extracted.

For example, as a solvent for cellulose, a known solvent, e.g. a mixed solvent of dimethyl sulfoxide and formaldehyde, cuprammonium solution, an aqueous solution of calcium thiocyanate can be used.

Generally, the solvents are suitably selected depending on the kinds of the polymers.

As mentioned above, it is desirable that the surface tension of the coagulating liquid is approximate to or less than that of the solvent of the polymer solution, and that the coagulating liquid is electric conductive. As the coagulating liquid, water with a surface active agent, an aqueous solution of alcohol and an aqueous solution of the above-mentioned solvent or a mixture thereof are particularly preferable so as to control the fine structure of the obtained polymer particles.

Uniform polymer particles in a spherical form suitable for use in the direct extracorporeal hemo-perfusion treatment of the present invention is described hereinafter.

The blood compatibility is judged according to the following method. A column having an inner diameter of 7 mm and a length of 100 mm is prepared and filters made of polyester, having an opening diameter of 20 $\mu$m, are fixed at both ends of the column in order to prevent the particles from leaking out. Then, the particles are dispersed in water of a volume of five times as much as the volume of the sedimented particles, and the particles are packed into the column by transmitting the dispersion into the column at a rate of 5 ml/min while observing that bubbles of gas are not mixed.

The average linear velocity is determined at 1.3 cm/min in consideration that blood is circulated at the flow rate of at least 50ml/min in actual treatment system and a column used in practice has a sectional area of about a hundred times of that of the column used in this examination.

Bovine blood maintained at a temperature of 37° C. is passed through the column at the above-mentioned average linear velocity. After an hour, the difference between the pressure at the inlet and the pressure at the outlet of the column, i.e. the pressure drop is measured, and it is confirmed whether hemolysis occurs or not to judge the blood compatibility. That is, when no hemolysis occurrs and the pressure drop is not more than 100 mmHg, the blood compatibility is judged good. The judgement whether hemolysis occurred or not is conducted by means that the blood run out of the column is subjected to the centrifugation, it is decided that hemolysis occurred when the plasma is extremely colored and hemolysis did not occur when the plasma is not colored.

As materials of the particles, cellulose acetate and cellulose are employed for convenience sake since there are a lot of points not explicated in the relation between the blood compatibility and the chemical properties of the particles as mentioned above, and therefore, the materials cannot be defined.

Generally available particles, e.g. particles used for chromatography have a broad particle size distribution. By repeating classification, it becomes possible to obtain the particles having a narrow particle size distribution from them. Nevertheless, the yield is low in this case, accordingly, the method is not practical.

Therefore, as described later the uniform particles of cellulose acetate are prepared according to the process of the present invention and the particles are compared with the commercially available cellulose particles used for chromatography on the blood compatibility.

Herein, when the uniform particles are densely packed into the column, the particle size of the substances which can be passed through between the particles in the column is about 15% of the particle size of the uniform particles. That is, when the particles having the particle size of about 70 μm are packed into the column, there arises a fear that erythrocyte sticks between the particles. If the volume average particle size is less than 80 μm, the pressure drop becomes too large. Accordingly, it is required that the particles have a volume average particle size of 80 to 400 μm, preferably 80 to 300 μm. When the volume average particle size is less than 80 μm, erythrocyte sticks between particles and the pressure drop is over 100 mmHg, also when the volume average particle size is more than 400 μm, the ability of adsorbing pathogenic substances having a high molecular weight is small, both of which are unpreferable. Further, it is necessary that not less than 80% by volume of the whole particles have a particle size within the range of ±20% of the volume average particle size. It is not preferable that the particles have a particle size distribution broader than the above-mentioned, i.e. not less than 80% by volume of the whole particles do not have a particle size within the range of ±20% of the volume average particle size. In such case, increase of the pressure drop or hemolysis occurs when many particles have a particle size of less than −20% of the volume average particles, or the ability of adsorption is lowered when many particles have a particle size of more than +20% of the volume average particles. Still more, even though the volume average particle size is not less than 80μm, the content of the particles having a particle size of less than 74 μm should be limited to not more than 5% by volume of the whole particles. When the content of them is more than 5% by volume, the pressure drop is over 100 mmHg, which is unpreferable.

When a direct extracorporeal hemo-perfusion treatment is carried out, minute particles must not flow into the blood. For the above reason, a filter with openings as small as possible is attached to the outlet for the blood from a column packed with particles. However, it is also desired that the opening diameter of the filter is at least 20 μm so as not to injure erythrocyte which is nearly 10 μm in diameter. Therefore, the content of the particles having a particle size of less than 25 μm must be not more than 0.1% by volume of the whole particles. When the column is packed with the particles containing more than 0.1% by volume of the particles of which particle size is less than 25 μm, the opening of the filter is clogged. However, according to the process of the present invention, the uniform polymer particles can be obtained in a spherical form containing only a few particles having a particle size of less than 25 μm. Further, it is possible to prepare the uniform polymer not containing the minute particles of the above size at all.

The particles used in the present invention, as a matter of course, have a strength so as not to be deformed with a pressure drop of at least 100 mmHg, which is confirmed from a result that the relation of the pressure drop and the flow rate, when passing water through the column packed with the particles, keeps a linear relationship until the pressure drop is increased to 100 mmHg.

The adsorbent use of the uniform polymer particles of the present invention, having the above-mentioned physical properties makes it possible to promptly remove pathogenic substances having a high molecular weight by a direct extracorporeal hemo-perfusion treatment, which is of great value.

The method of direct extracorporeal hemo-perfusion treatment of the present invention is carried out as follows. That is, blood is taken out from the body, and then, without separating the blood into blood plasma and blood cell, the blood is let pass through a container packed with uniform polymer particles in a spherical form, having a volume average particle size of 80 to 400 μm, wherein not less than 80% by volume of the whole particles have a particle size within the range of ±20% of the volume average particle size, the content of particles having a particle size of less than 74 μm is not more than 5% by volume, the content of particles having a particle size of less than 25 μm is not more than 0.1% by volume, and the uniform polymer particles do not include particles having a particle size of not more than 5% of the volume average particle size. The treated blood is returned to the body.

The present invention is more specifically described and explained by means of the following Examples in which all percents ant parts are by weight unless otherwise noted. It is to be understood that the present invention is not limited to the Examples and various changes and modifications may be made in the invention without departing from the spirit and scope thereof.

EXAMPLE 1

Cellulose acetate (degree of acetylation: 55%) was dissolved in a mixture of N-methyl-2-pyrrolidone and propylene glycol mixed at a weight ratio of 4 : 6 to prepare a polymer solution having a cellulose acetate concentration of 5%. The polymer solution had a viscosity of 78 cP at 90° C. The surface tension of the mixed solvent was 38 dyn/cm, which is the arithmetical mean value of the surface tension of the solvent at 25° C.

By using the apparatus shown in FIG. 1, the polymer solution was jetted through the nozzle (5) having two orifice (12) having a diameter of 50 μm, aligned at an interval of 5 mm. At that time, the parameters were adjusted to attain the synchronized condition, i.e. the distance between the end (16) of the vibrating rod (6) and the nozzle (5) was 15 mm, the temperature of the polymer solution was maintained at 90° C., the frequency of the vibrating rod (6) connected with the magnetostrictive vibrator was 25 KHz and the flow rate of the jetted liquid was 18 m/sec, to give uniform liquid droplets.

At the position of about 2 mm from the lower face of the nozzle (5), parallel-plate electrodes having a width of 20 mm and a distance between the plates of 10 mm were set parallel to the orifices (12), and a voltage of 500 V was given to the droplets between the cylinder and the parallel-plate electrodes. The cylinder was grounded.

A coagulating liquid was put into a grounded cylindrical container made of stainless steel having a diameter of about 40 cm, and the container was put right under the nozzle (5) so as to make the distance between the nozzle and the surface of the coagulating liquid 40 cm. As the coagulating liquid, a 40% ethanol aqueous solution at room temperature was employed. The surface tension of the coagulating liquid was 32 dyn/cm at 25° C.

The obtained particles were perfectly spherical, and from which any minute polymer chips did not occur even though the particles were stirred with a magnetic stirrer for about 3 hours.

The above particles were suspended in water and classified by passing through wet sieves having opening sizes of 44 μm, 63 μm, 74 μm, 88 μm, 105 μm, 125 μm and 149 μm, respectively. Particles which gathered on each sieve were suspended in water and the volume of the sedimented particles was measured after allowing them to stand for a day. The volume average particle size of the obtained particles was 111 μm and not less than 97% by volume of the whole particles had a particle size within the range of ±20% of the volume average particle size. There could not be found a particle with a particle size of less than 44 μm. Further, particle with a particle size of not more than 5% of the volume average particle size or with a particle size of less than 5 μm was not recognized by using COULTER COUNTER ® (made by COULTER ELECTRONICS, INC.)

EXAMPLE 2

The particles obtained in Example 1 were fully washed with methanol and dried under vacuum at room temperature. After vapor deposition of gold on them, the surface and section of the particles were observed with a scanning electron microscope. It was observed that the particles had no skin layer and had a lot of pores of about 0.5 μm on the surface from the section it was determined that the particles had internal pores which were nearly as large as and as many as those on the surface, which showed that a three dimensional network structure was extended all over the particle.

EXAMPLE 3

Cellulose acetate (degree of acetylation: 61.5%) was dissolved in a mixture of dimethyl sulfoxide and propylene glycol mixed at a weight ratio of 6 : 4 to prepare a polymer solution having a concentration of 5%. Then, uniform polymer particles were obtained in the same manner as in Example 1 except that a 0.2% aqueous solution of a detergent for home use (commercially available under the trade name "Runa Mild" made by Kao Corporation) was used as the coagulating liquid. The viscosity of the polymer solution was 52 cP at 90° C. The surface tension of the mixture solvent of the polymer solution was 39 dyn/cm, which is the arithmetical mean values of the surface tension of the solvents at 25° C. The surface tension of the coagulating liquid was 20 dyn/cm at 25° C.

The particles were heated at 120° C. for 30 minutes with immersing the particles in water. By means of this treatment, the particles were uniformly shrinked about 20% in diameter.

The obtained particles were perfectly spherical, and from which any minute polymer chips did not occur even though the particles were stirred with the magnetic stirrer for about 3 hours.

The surface and section of the particles were observed with the scanning electron microscope in the same manner as in Example 2. There was a skin layer having a thickness of about 0.1 μm on the surface of the particle, on which no pore was observed even though the observation was carried out at a magnification of 20,000 X. Except on a surface, the three dimensional network structure was observed.

The classification was carried out with wet sieves in the same manner as in Example 1. As a result of the measurement of the particle size distribution, the obtained particles had the volume average particle size of 103 μm and not less than 97% by volume of the whole particles had a particle size within the range of ±20% of the volume average particle size. There could not be found a particle having a particle size of less than 44 μm.

EXAMPLE 4

Polystyrene was dissolved in N-methyl-2-pyrrolidone to prepare a polymer solution having a concentration of 15%. The polymer solution had a viscosity of 250 cP at 90° C. and a surface tension of the solvent of the solution 41 dyn/cm at 25° C. Uniform polymer particles were obtained from the above solution in the same manner as in Example 3.

The obtained particles were perfectly spherical, and from which any minute polymer chips did not occur even though the particles were stirred with the magnetic stirrer for about 3 hours.

The classification was carried out with wet sieves in the same manner as in Example 1. As a result of the measurement of the particle size distribution, the obtained particles had a volume average particle size of 116 μm and not less than 97% by volume of the whole particles had a particle size within the range of ±20% of the volume average particle size. Particles with a particle size of less than 44 μm could not be found.

EXAMPLE 5

Cellulose was dissolved in a 60% aqueous solution of calcium thiocyanate to prepare a polymer solution having a cellulose concentration of 4%. The solution had a viscosity of 550 cP at 100° C. and a surface tension of the solvent of the solution 73 dyn/cm at 25° C. By using the above solution, uniform polymer particles were obtained in the same manner as in Example 1 except that a 50% ethanol solution was used as the coagulating liquid, and, the apparatus shown in FIG. 1 was set so that the distance between the end (16) of the vibrating rod (6) and the nozzle (5) was 5 mm and the temperature of the polymer solution was 100° C. The surface tension of the coagulating liquid was 30 dyn/cm at 25° C.

The obtained particles were perfectly spherical and from which any minute polymer chips did not occur even though the particles were stirred with the magnetic stirrer for about 3 hours.

The classification was carried out with wet sieves in the same manner as in Example 1. As a result of the measurement of the particle size distribution, the obtained particles had the volume average particle size of 112 μm and not less than 97% by volume of the whole particles had a particle size within the range of ±20% of the volume average particle size. There could not be found a particle having a particle size of less than 44 μm.

In Examples 1 to 5, there was used the nozzle which had the orifice (12) with a aperture diameter of 50 μm. However, by changing the aperture diameter and adjusting the parameters to attain the synchronized condition for giving uniform liquid droplets, droplets having a diameter of not more than 1,000 μm, not more than 500 μm or not more than 250 μm, respectively, and having a narrow particle size distribution can be suitably obtained in compliance with the uses of the polymer particles.

EXAMPLE 6

Cellulose acetate (degree of acetylation: 61.5%) was dissolved in N-methyl-2-pyrrolidone to prepare a polymer solution having a cellulose acetate concentration of 7%. The solution had a viscosity of 350 cP at 64° C. and a surface tension of the solvent of the solution 41 dyn/cm at 25° C.

By using the apparatus shown in FIG. 1, the polymer solution was jetted through the orifice (12) having a round shape with a diameter of 50 μm at a flow rate of 2500 cm/sec.

In order to obtain uniform liquid droplets, each parameter was adjusted to attain the synchronized condition, i.e. the distance between the end (16) of the vibrating rod (6) and the nozzle (5) was 15 mm, the temperature of the polymer solution was maintained at 64° C., the frequency of the vibrating rod (6) which was connected with the magnetostrictive vibrator (which was not shown in FIG. 1) via the vibration transmission part (15) were 25 KHz and the amplitude of vibration of the top (16) of the vibrating rod was 5 μm. When the pressure of the polymer solution in the cylinder (2) was 15.9 Kg/cm$^3$, uniform liquid droplets were stably formed.

Figure 2:
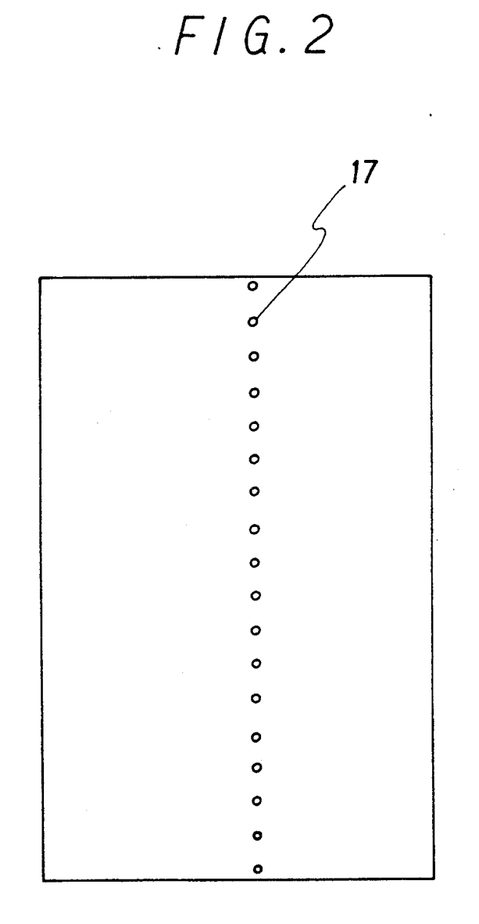
FIG. 2 is a sketch of the photograph of uniform liquid droplets obtained in Example 1.

It was confirmed that the uniform liquid droplets were formed actually by taking a photograph of the droplets at the position of 5 cm downward from the nozzle with turning on and off a stroboscope ("MSX-1A" type, made by Kabushiki Kaisha Sugawara Kenkyusho). As shown in FIG. 2 which is a sketch of the photograph, it was observed that the droplets (17) having a uniform diameter of about 155 μm were in a line at regular intervals.

EXAMPLE 7

Cellulose acetate (degree of acetylation: 55%) was dissolved in dimethyl sulfoxide to prepare a polymer solution having a cellulose acetate concentration of 16%. The solution had a viscosity of 380 cP at 130° C. and a surface tension of the solvent of the solution 43 dyn/cm at 25° C.

By using the apparatus shown in FIG. 1, the polymer solution was jetted from the orifice (12) having a round shape with a diameter of 50 μm at a flow rate of 2,800 cm/sec. Uniform liquid droplets having a diameter of about 115 μm were obtained stably when the parameters were adjusted to attain the synchronized condition, i.e. the distance between the end (16) of the vibrating rod (6) and the nozzle (5) was 5 mm, the temperature of the polymer solution was maintained at 130° C., the frequency of the vibrating rod (6) was 25 KHz and the amplitude of vibration of the top (16) of the vibrating rod was 5 μm. At that time, the pressure of the polymer solution in the cylinder (2) was 16.2 Kg/cm$^2$.

EXAMPLE 8

Polystyrene was dissolved in N-methyl-2-pyrrolidone to prepare a polymer solution having a polystyrene concentration of 15%. The viscosity of the solution was 250 cP at 90° C.

By using the apparatus shown in FIG. 1, the polymer solution was jetted from the round shape orifice (12) with an aperture diameter of 35 μm at a flow rate of 2000 cm/sec. The parameters were adjusted to attain the synchronized condition, i.e. the distance between the end (16) of the vibrating rod (6) and the nozzle (5) was 15 mm, the temperature of the polymer solution was maintained at 90° C., the frequency of the vibrating rod (6) was 25 KHz and the amplitude of vibration of the end (16) of the vibrating rod was about 5 μm. The pressure of the polymer solution in the cylinder (2) was 29 Kg/cm$^2$ at that time, and uniform liquid droplets having a diameter of about 115 μm were obtained stably.

From the above-mentioned results, it is recognized that minute uniform liquid droplets can be obtained from a liquid having a high temperature, a high pressure and a high viscosity by using the apparatus of the present invention, which is impossible with an apparatus conventionally used.

EXAMPLE 9

Cellulose acetate (degree of acetylation: 61.5%) was dissolved in a mixture of dimethyl sulfoxide and propylene glycol mixed in a weight ratio of 6 : 4 to prepare a polymer solution having a cellulose acetate concentration of 5%. The solution was heated to 90° C. and jetted through a nozzle with a orifice having an aperture diameter of 50 μm at a flow rate of 18 m/sec, while applying turbulences with a constant frequency of 25 KHz to give uniform liquid droplets. In order to give electric charge to the liquid droplets, parallel-plate electrodes having a width of 20 mm and a distance between the plates of 10 mm was set at the position of about 2 mm from the lower face of the nozzle and a voltage of 500 V was given to the droplets between the nozzle and the electrodes. A grounded container made of stainless steel in which a 40% ethanol solution was contained was set about 50 cm right under the nozzle.

When the minute droplets with electric charge, uniformly jetted one by one were letted into the aqueous solution of ethanol, they were coagulated to be spherical particles. The obtained particles were washed with water and heated at 120° C. for 30 minutes with immersing them in water.

The particles were suspended in water and classified by using wet sieves having the size of sieve opening 44 μm, 63 μm, 74 μm, 83 μm, 105 μm, 125 μm and 149 μm, respectively. The effluent solution which was passed through the sieve of 44 μm and each particle caught on each sieve was suspended in water. After allowing to stand them for a day, the volume of sedimented particles was measured and the volume average particle size and the particle size distribution were calculated. The volume average particle size was 100 μm, the content of particles having a particle size of less than $\theta$ μm was not more than 1% by volume, and particles with the particle size of less than 44 μm were not recognized. Further, not less than 97% by volume of the whole particles had a particle size within the range of ±20% of the volume average particle size.

The particles were suspended in water of a volume of about five times as much as the volume of sedimented particles and the suspension was passed through a column with a inner diameter of 7 mm and a length of 100 mm, equipped with a filter made of polyester, of which opening diameter as 20 μm, at the outlet of it at a flow rate of 5 ml/min to pack the particles in the column. When the column was filled with the particles, it was stopped to transmit the suspension and the inlet of the column was also covered with a cap attached with a filter of which opening diameter was 20 μm.

Bovine blood containing 1 part by volume of 3.1% tris buffer solution of sodium citrate as an anticoagulant, based on 9 parts by volume of blood was maintained at the temperature of 37° C., and the blood was sent into the above-mentioned column at a flow rate of 0.5 ml/min. Though the pressure drop was gradually risen with the passage of time, it was 85 mmHg after 1 hour had passed. Also, there occurred no hemolysis.

COMPARATIVE EXAMPLE 1

The procedure of Example 1 was repeated except that commercially available hard cellulose particles used in chromatography were classified with sieves of which opening size were 25 μm, 44 μm, 63 μm, 74 μm, 88 μm, 105 μm, 125 μm and 149 μm, respectively. The content of the particles having particle size of less than 25 μm was 0.3% by volume and the content of the particles having particle size of less than 74 μm was 7.7% by volume. The volume average particle size of the particles was 95 μm and at most 66% by volume of the whole particles had a particle size within the range of ±20% of the volume average particle size.

A column was made with the above particles and bovine blood was passed through the column in the same manner as in Example 9. Since the pressure drop reached 172 mmHg after 30 minutes, the hemo-perfusion was stopped. It was confirmed that hemolysis occurred in effluent blood from the column.

From the results mentioned above, it was confirmed that when the direct extracorporeal hemo-perfusion was conducted by employing the particles of the present invention, the pressure drop was not increased to more than 100 mmHg even after 1 hour of operation, which showed the particles of the present invention were excellent in blood compatibility.

In addition to the ingredients used in the Examples, other ingredients can be used in the Examples as set forth in the specification to obtain substantially the same results.

What we claim is:

1. A process for preparing substantially uniform porous polymer particles which comprises: forming a solution of said polymer comprising said polymer and a solvent therefore; subjecting said polymer solution to cyclic turbulences having a substantially constant frequency of about 1,000 to 40,000 Hz sufficient to mechanically form substantially uniform liquid droplets of said solution which have substantially the same sign electric charge; jetting these droplets from an orifice into a gas atmosphere at a substantially constant flow rate; passing said droplets through said gas atmosphere; and impinging said droplets on a surface of a coagulating liquid, which is a non-solvent for said polymer, is miscible with said solvent and has a surface tension sufficient to spontaneously substantially wet said liquid droplets; wherein the distance between said orifice and said surface of said coagulating liquid is such that said droplets are not substantially deformed by their collision with the surface of said coagulating liquid, and wherein said coagulating liquid acts to coagulate said polymer droplets.

2. The process of claim 1, wherein said polymer solution has a viscosity of 10 to 2,000 cP.

3. The process of claim 1, wherein said turbulences have a frequency of 3,000 to 40,000 Hz.

4. The process of claim 1, wherein the solvent of said polymer solution is miscible with water.

5. The process of claim , wherein said liquid droplets have a diameter of not more than 1,000 μm.

6. The process of claim 1, wherein said liquid droplets have a diameter not more than 250 μm.

7. The process of claim 1, wherein said coagulating liquid has a surface tension not more than that of the solvent of the polymer solution.

8. The process of claim 1, wherein said coagulating liquid has an electric conductivity.

9. The process of claim 1, wherein said coagulating liquid is an aqueous solution.

* * * * *